(12) United States Patent
Gunther

(10) Patent No.: US 7,030,167 B2
(45) Date of Patent: Apr. 18, 2006

(54) NANOPOROUS STRUCTURES PRODUCED FROM SELF-ASSEMBLING MOLECULES

(75) Inventor: Janelle Gunther, Mountain View, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 264 days.

(21) Appl. No.: 10/607,157

(22) Filed: Jun. 25, 2003

(65) Prior Publication Data

US 2004/0266919 A1 Dec. 30, 2004

(51) Int. Cl.
*C08J 9/00* (2006.01)

(52) U.S. Cl. .......................... 521/77; 521/98; 521/134; 521/53; 438/31

(58) Field of Classification Search ................ 521/77, 521/98, 134, 53, 52, 137; 524/37; 438/31
See application file for complete search history.

(56) References Cited

U.S. PATENT DOCUMENTS 5,849,215 A * 12/1998 Gin et al. .............. 252/299.01
6,156,812 A * 12/2000 Lau et al. ...................... 521/77
6,653,358 B1* 11/2003 Bruza et al. .................. 521/77

OTHER PUBLICATIONS

Hulteen et al. "Introducing Chemical Transport Selectivity into Gold Nanotuble Membranes" J. Am. Chem. Soc. 1998, 120, 6603-6604.
J.S. Moore and S.I. Stupp "Materials Chemistry of Chiral Macromolecules. 1. Synthesis and Phase Transitions" 1992 American Chemical Society pp. 3429-3441.
Janelle Gunther and Samuel I. Stupp, "Surface Patterns of Supramolecular Materials" Langmuir 2001, 17, 6530-6539.
Hartgerink et al. "Peptide-amphiphile nanofibers: A versatile scaffold for the preparation of self-assembling materials" PNAS, Apr. 16, 2002, vol. 99., No. 8, 5133-5138.
Huggins et al. "Two-Dimensional Supramolecular Assemblies of A Polydiacetylene. 1. Synthesis, Structure, and Third-Order Nonlinear Optical Properties", Macromolecules 1997, 30, 5305-5312.
Hwang et al. "Self-assembling biomaterials" Liquid crystal phases of cholesteryl oligo)L-lactic acid) and their interactions with cells PNAS, Jul. 23, 2002, vol. 99, No. 15, 9662-9667.

(Continued)

*Primary Examiner*—Irina S. Zemel

(57) ABSTRACT

Methods for producing nanoporous structures are provided. In the subject methods, two or more, e.g., first and second, different types of self-assembling molecules are combined with each other under conditions sufficient to produce a composite ordered structure from the two or types of molecules. A feature of two or more molecules that are combined in this first step is that a portion of the molecules include cross-linking functionalities not found in the other portion of the molecules. The resultant self-assembled composite structure is then subjected to conditions sufficient for cross-linking of the portion of the molecules that includes the cross-linking functionalities to produce a stabilized composite structure. Finally, the remaining non-cross-linked molecules of the stabilized composite structure are separated from the stabilized composite structure to produce a nanoporous structure. Also provided are nanoporous structures produced according to the subject methods, articles of manufacture that include the same, as well as kits for use in practicing the subject methods.

14 Claims, 3 Drawing Sheets

OTHER PUBLICATIONS

Jenekhe and Chen "Self-Assembly of Ordered Microporous Materials from Rod-Copolymers" Jan. 15, 1999, vol. 283, Science, 372-375.

Jenekhe and Chen "Self-Assembled Aggregates of Rod-Coil Block Copolymers and Their Solubilization and Encapsulation of Fullerenes", Science, vol. 279, Mar. 20, 1998, 1903-1907.

Moore and Stupp "Paramagnetic organometallic liquid crystal polymers" Polymer Bulletin 19, 251-256 (1988).

Muthukumar et al "Competing Interactions and Levels of Ordering in Self-Organizing Polymeric Materials" Science, vol. 277, Aug. 29, 1997, 1225-1232.

Stupp et al. "Materials Chemsitry: From Glasses to Liquid Crystals To Crystals Through Molecular Symmetry and Functionalization" ACS Polymer Preprints, 1989, 396-397.

Stupp and Braun "Molecular Manipulation of Microstructures: Biomaterials, Ceramics, and Semiconductors" Science, vol. 277, Aug. 29, 1997, pp. 1242-1248.

Stupp et al. "Supramolecular Materials: Self-Organized Nanostructures" Science vol. 276, Apr. 18, 1997, 384-389.

Stupp et al. "Bulk Synthesis of Two-Dimensional Polymers: The Molecular Recognition Approach" J. Am. Chem. Soc. 1995, 117, 5212-5277.

Stupp et al. "synthesis of Two-Dimensional Polymers" Science, vol. 259, Jan. 1, 1993, 59-63.

Zubarev et al. "Conversion of Supramolecular Clusters to Macromolecular Objects" Science, vol. 283, Jan. 22, 1999, 523-526.

* cited by examiner

FIG. 3B  regions where phase separated material dissolves out solid nano-object object with nano-holes created by dissolving out phase separated material

NANOPOROUS STRUCTURES PRODUCED FROM SELF-ASSEMBLING MOLECULES

FIELD OF THE INVENTION

The field of this invention is self-assembling molecules and nanostructures produced thereby.

BACKGROUND OF THE INVENTION

Molecular self-assembly has been defined as "the spontaneous association of molecules under equilibrium conditions into stable, structurally well-defined aggregates joined by noncovalent bonds." Whitesides et al., Science (1991) 254:1312–1319. Many examples of self-assembly occur in biology, including amphiphilic bilayers in cell membranes, the T4 phage particle, and the transmembrane toxin $\alpha$-hemolysin. One of the most important aspects of self-assembly is the fact that the final biological structures are generally self-healing and relatively defect-free. This feature is a result of the thermodynamic processes that drive the self-assembly process. In addition, the aforementioned biological structures spontaneously assemble in the correct order and into the correct configuration without the need for complex atom-by-atom synthesis. The above attributes of biological self-assembly are some of the motivating factors that have prompted researches to attempt to mimic self-assembly systems in the laboratory via synthetic routes.

For the purposes of nanofabrication, chemical self-assembly has several advantages. One advantage is that nanoscale objects are synthesized spontaneously, without the need for expensive or elaborate equipment. Another advantage is that construction of nanostructures using atom-by-atom protocols can be extremely time consuming and resource intensive, if not impossible to perform.

While self-assembly of nanostructures is of great interest, the majority of work to date has focused on the self-assembly of solid nanostructures. In certain applications, porous nanostructures are desired. While attempts to produce porous nanostructures via self-assembly protocols have been made, such have not been completely successful. For example, the porosity of such structures may be inconsistent, the pore diameter may be too large, etc.

As such, there is a need for nano-objects and durable membrane structures with internal nanopores offering the characteristics of electrical reliability, as well as consistent overall size and pore diameter. In addition, there is also a need for durable nanoporous membrane structures. The present invention satisfies these, and other, needs.

Relevant Literature

Articles of interest include: Gunther & Stupp, Langmuir (2001) 17:6530–6539; Hartgerink et al., Proc. Nat'l Acad. Sci. USA (2002) 99: 5133–5138; Huggins et al., Macromolecules (1997) 30: 5305–5312; Hulteen et al., J. Am. Chem. Soc. (1998) 120: 6603–6604; Hwang et al., Proc. Nat'l Acad. Sci. USA (2002) 99: 9662–9667; Jenekhe et al., Science (1999) 372–375; Jenekhe et al., Science (1998) 279: 1903–1907; Moore and Stupp, J. Am. Chem. Soc. (1992) 114: 9; Moore & Stupp, Polymer Bulletin (1988) 19: 251–256; Muthukumar et al., Science (1997) 277:1225–1232; Stupp et al., ACS Polymer Preprints (1989) 30: 396–397; Stupp et al., Science (1993) 259:59–63; Stupp et al., Science (1997) 276: 384–389; Stupp et al., Science (1997) 277: 1242–1248; Stupp et al., J. am. Chem. Soc. (1995) 117: 5212–5227; and Zubarev et al., Science (1999) 283:523–526.

SUMMARY OF THE INVENTION

Methods for producing nanoporous structures are provided. In the subject methods, two or more, e.g., first and second, different types of self-assembling molecules are combined with each other under conditions sufficient to produce a composite ordered structure from the two or types of molecules. A feature of two or more molecules that are combined in this first step is that a portion of the molecules include cross-linking functionalities not found in the other portion of the molecules. The resultant self-assembled composite structure is then subjected to conditions sufficient for cross-linking of the portion of the molecules that includes the cross-linking functionalities to produce a stabilized composite structure. Finally, the remaining non-cross-linked molecules of the stabilized composite structure are separated from the stabilized composite structure to produce a nanoporous structure. Also provided are nanoporous structures produced according to the subject methods, articles of manufacture that include the same, as well as kits for use in practicing the subject methods.

BRIEF DESCRIPTION OF THE FIGURES

FIGS. 3A–3B and 4A to 4B provide schematic drawings of representative structures that can be prepared according to the subject methods.

DESCRIPTION OF THE SPECIFIC EMBODIMENTS

Figure 1:
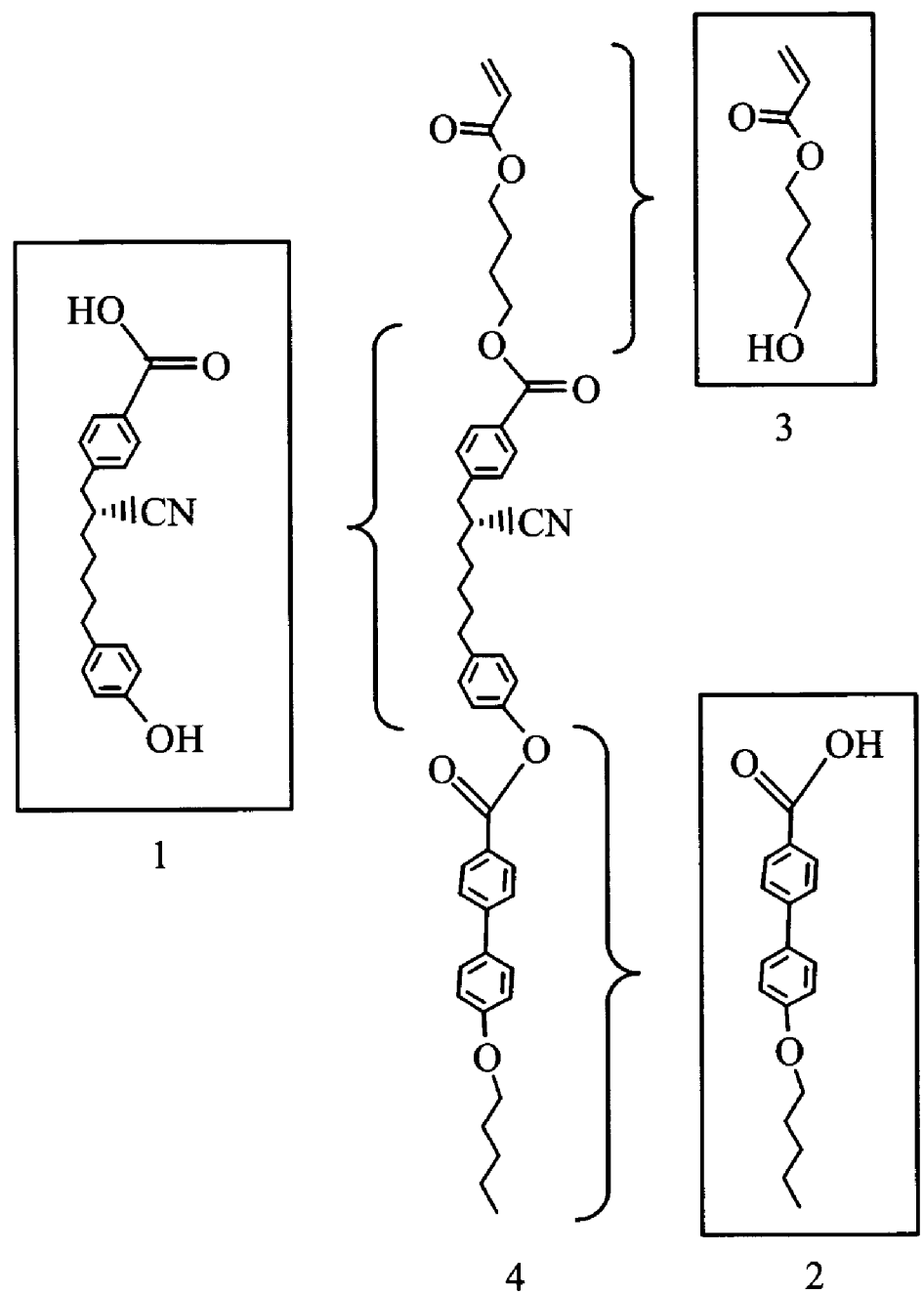
FIGS. 1 and 2 provide structures of representative self-assembling molecules that can be employed in methods of the subject invention.

Methods for producing nanoporous structures are provided. In the subject methods, two or more, e.g., first and second, different types of self-assembling molecules are combined with each other under conditions sufficient to produce a composite ordered structure from the two or types of molecules. A feature of two or more types of molecules that are combined in this first step is that a portion of the molecules include cross-linking functionalities not found in the other portion of the molecules. The resultant self-assembled composite structure is then subjected to conditions sufficient for cross-linking of the portion of the molecules that includes the cross-linking functionalities to produce a stabilized composite structure. Finally, the remaining non-cross-linked molecules of the stabilized composite structure are separated from the stabilized composite structure to produce a nanoporous structure. Also provided are nanoporous structures produced according to the subject methods, articles of manufacture that include the same, as well as kits for use in practicing the subject methods.

Before the subject invention is described further, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

In this specification and the appended claims, the singular forms "a," "an" and "the" include plural reference unless the context clearly dictates otherwise.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood to one of ordinary skill in the art to which this invention belongs. Although any methods, devices and materials similar or equivalent to those described herein can be used in the practice or testing of the invention, the preferred methods, devices and materials are now described. Methods recited herein may be carried out in any order of the recited events which is logically possible, as well as the recited order of events.

All patents and other references cited in this application, are incorporated into this application by reference except insofar as they may conflict with those of the present application (in which case the present application prevails).

In further describing the subject invention, the subject methods of making nanoporous structures, as well as the reagents employed therein and resultant structures thereof, are reviewed first in greater detail, followed by a review of representative applications in which the subject methods and products thereof find use, as well as kits of reagents that find use in practicing the subject methods.

Methods

As summarized above, the subject invention provides methods of making nanoporous structures. Nanoporous structures produced by the subject methods are structures that include one or more pores, where the pores are nanoscale in that they have diameters described in terms of nanometers. The structures produced by the subject methods are reviewed in greater detail below.

A feature of the subject methods is that the subject nanoporous structures are produced using a self-assembly protocol, in which at least two different self-assembling or self-organizing molecules are combined under self-assembly conditions to produce an initial composite structure, where the initial composite structure is a regular or ordered structure made up of the two or more self-assembling molecules. In other words, the resultant structure is a stable, well-defined aggregate structure in which the two or more self-assembling molecules thereof are held together by non-covalent bonds. The initial composite structure is then stabilized by subjecting it to cross-linking conditions, such that a subpopulation of the constituent molecules covalently bond to one another to produce a shape invariant composite structure. The resultant stabilized shape invariant composite structure is then subjected to conditions sufficient to separate the non-covalently bonded constituent molecules thereof from the remainder of the structure, resulting in the production of the desired nanoporous structure. Each of these composite steps is now described below separately in greater detail.

Production of Composite Structure by Self-Assembly

As summarized above, the first step in the subject methods is to produce a regular, uniformly ordered composite structure from two or more self-assembling or self-organizing molecules, i.e., by a self-assembly process. In performing the first step of the subject methods, two or more different types of molecules are combined together under conditions sufficient for the molecules to self-assemble or self-organize into a regular or ordered structure. By regular or ordered structure is meant an aggregate of molecules having a regular or defined order, e.g., a planar structure, a nanostructure, etc., where the constituent molecules of the composite structure are held together by non-covalent interactions.

The regular or ordered structure produced upon combination and subsequent self-assembly or self-organization of the two or more self-assembling or self-organizing molecules may be any of a number of disparate configurations, depending on the nature of the self-assembling molecules employed to make the structure. Representative configurations of interest include, but are not limited to: two-dimensional sheets or membranes; particulate nanostructures (e.g., "mushroom" shaped particulate nanostructures); rods, discs, stacks, cylinders, spheres, and the like.

As indicated above, in the first step at least two or more different types of molecules that self-assemble or self-organize with each other to produce the desired composite structure are combined under conditions sufficient for self-assembly to occur. The number of different or distinct types of self-assembling molecules that are combined in this first step may vary, where the number may range from about 1 to about 10, e.g., from about 1 to about 5, where the number is 2 or 3, and more often 2, in many embodiments.

A feature of the 2 or more constituent types of molecules that are combined in the initial step is that a portion of the constituent members include one or more functionalities that provide for covalent bonding or cross-linking to one another (also known in the art as "stitching"), as described below in review of the second step of the subject methods, while the remainder portion of the constituent members lack such functionalities found in members of the first portion. For example, where first and second self-assembling molecules are employed in the first step, each of the identical "first" molecules includes one or more covalent bonding functionalities that provides for the ability to cross-link the molecules, as described below, while each of the identical "second" molecules lacks these one or more functionalities.

In addition to depending on the specific nature of the two or more self-assembling molecules, e.g., the first and second self-assembling molecules, the composite structure that is self-assembled therefrom is also dependent on the proportion of the two or more different types of molecules that are combined with each other in the first step. Where a population of first and second molecules are combined in this first step, the first and second molecules are, in certain representative embodiments, combined in a molar ratio ([first]/[second]) that may range from about 1/100 to about 30/100, such as from about 4/100 to about 20/100, including from about 10/100 to about 15/100.

As mentioned above, the collection of two or more different types of molecules employed in the first step includes a portion of molecules that include a covalent bonding or cross-linking functionality and a portion of molecules that lack this functionality or these functionalities. Additional differences that may be present between different constituent members of the employed population of two or more different molecules may include, but are not limited to: specific terminating functional groups, pendant groups, individual blocks used in the diblock or triblock molecule, and the like. For example, the portion of molecules that do not include a cross-linking functionality may include additional terminal functionalities that promote their association with each other, that promote there separation from the stabilized composite structure, as described below, etc. In yet another representative example, the portion of molecules that does include a cross-linking functionality may further include functionalities that are exploited in the use of the final product, e.g., pore lining functionalities that impart desirable properties to the pores of the resultant structure, such as surface transport enhancement, etc.

Despite the above differences, including optional differences, among the population of two or more different kinds of self-assembling molecules, the different types of self-assembling molecules are, in certain embodiments, sufficiently similar such that they do self-assemble or organize into the desired composite structure. As such, in certain embodiments all of the molecules of the two or more different molecules have a common backbone or framework structure, where the only difference among the different types of molecules is, e.g., the presence or absence of a cross-linking functionality, the presence or absence of terminal functionalities, etc.

While the nature of the different molecules employed to self-assemble the composite structure may vary, in certain embodiments the molecules are elongated linear molecules, that may or may not include one or more branches, where the molecules may range in length from about 4 nanometers to about 50 nanometers, usually from about 5 nanometers to about 10 nanometers in certain embodiments. The molecular weight of the molecules may vary, but in certain embodiments ranges from about 500 g/mol to about 5000 g/mol, such as from about 1500 g/mol to about 2500 g/mol. In many embodiments, the molecules are organic molecules, ranging anywhere from about 75 to about 300 carbon atoms, such as from about 125 to about 150 carbon atoms, where the molecules often include one or more of, including a plurality of different features, e.g., heteroatoms, cyclic structures, including aryl moieties, sites of unsaturation, polar groups, either within or pendant to the main chain, and the like.

In certain embodiments, the different types of molecules employed are multiblock polymers that include two or more different domains or blocks in linear configuration, where each of the two or more different blocks works in concert to provide for the desired self-assembly and/or crosslinking functionality. For example, one can have triblock structure molecules that include terminal blocks that provide for self-assembly or organization with other molecules, limitation of the size of the aggregate formed with other molecules, etc., and an internal block that does or does not include a crosslinking functionality.

Where elongated organic molecules are employed in the self-assembly process, they may include functionalities at one or more termini that impart desired properties in the structures produced from the self-assembling molecules. For example, hydrophilic functionalities, such as —OH, —COOH, and the like, may be present at termini so that the resultant structures are soluble in aqueous environments, adhere well to hydrophilic surfaces, etc. Alternatively, hydrophobic moieties may be present at termini where in the final structure the hydrophobic surfaces are desired. Hydrophobic moieties of interest include, but are not limited to: —$CF_3$, —$CH_3$, —$CH_2CH_3$, Phenyl, and the like.

A number of different types of self-assembling organic molecules are known to those of skill in the art, and may be employed, e.g., either directly or modified (e.g., by removal of cross-linking functionalities), in the subject methods. As mentioned above, the specific nature of the molecules employed in the composite structure generation step of the subject methods depends on the desired configuration of the composite structure. Where the composite structure to be produced in the first step is a two-dimensional sheet or membrane, the two or more different molecules that are employed, e.g., the first and second molecules employed, are ones that self-assemble to produce the desired planar structure, e.g., membrane or sheet. A variety of different molecules are known to spontaneously form two-dimensional sheets, where such molecules include, but are not limited to those described in: Huggins et al., *Macromolecules,* 30 (18) 5305 (1997); Stupp, Son, Lin, Li, Science 259, 59(1993); Stupp et al, J. Am. Chem. Soc. 117, 5212 (1995); and the like.

There are several classes of materials that can form two-dimensional sheets. One type of layered structures is formed by amphiphiles that polymerize upon dispersal in water. Examples of these compounds include, but are not limited to, those found in the following references: (1) Hub et al. Chem. Int. Ed. Engl. 1980, 19, 938 (2) Kuo, et al., Langmuir 1991, 7, 584 (3) Asakuma et al., J. Am. Chem. Soc. 1991, 113, 1749. Another type of layered structure is formed by molecules that form infinite 2D networks at an oil-water interface. Descriptions of representative compounds of these embodiments can be found in: (1) Rehage, et al., Makromol. Chem. 1988, 189, 2395; and (2) Dubalt, et al., J. Phys. Chem. 1975, 79, 2254. One common factor in these types of systems is the fact that they are not shape-persistent. In other words, if the confining boundary is removed, then the 2D shape collapses. There are however, several types of molecules that form shape-persistent 2D sheets. One such system consists of a bifunctional molecule containing acrylate and nitrile groups, such as the compounds described in detail by Stupp et al. J. Am. Chem. Soc. 1995, 117, 5212–5227. Having two functional groups in the backbone of the constituent molecules helps ensure formation of a sheet. With only one functional group, the molecules would form a comb polymer, which is related to a linear chain. Another characteristic of shape persistent systems is the fact that if they do not posses $D_{\infty h}$ symmetry then they need to have enough orientational order to ensure that the reactive molecules are in distinct planes. Another characteristic of these shape-persistent systems is that the two reactive groups within the molecule need to be far enough apart so that reactive groups from one plane do not cross-react with reactive groups in the other plane.

Another 2D sheet structure of interest includes that described in Huggins et al., Macromolecules 1997, 30, 5305–5312. In this reference, a precursor molecule that contained diacetylene functional groups as well as other functional groups that were capable of forming hydrogen bonds was employed. In this specific situation, the groups that form hydrogen bonds play a role in the molecular stitching reaction that helps the system maintain its 2D sheet-like nature. These molecules fulfill the same criteria as those described in the article by Stupp et al. supra. The reactive groups, in this case the diacetylene and the OH groups, are far enough apart to ensure that 2D polymers rather than combs or ladders are formed. There is also the required amount of orientational order and rigidity.

These examples illustrate the fact that a variety of functional groups can be used to create the stitching reactions that help create the shape-persistent 2D sheets. If the 3 general criteria described previously are satisfied, then other reactive groups could be substituted for the ones described in the previous references.

Figure 2:
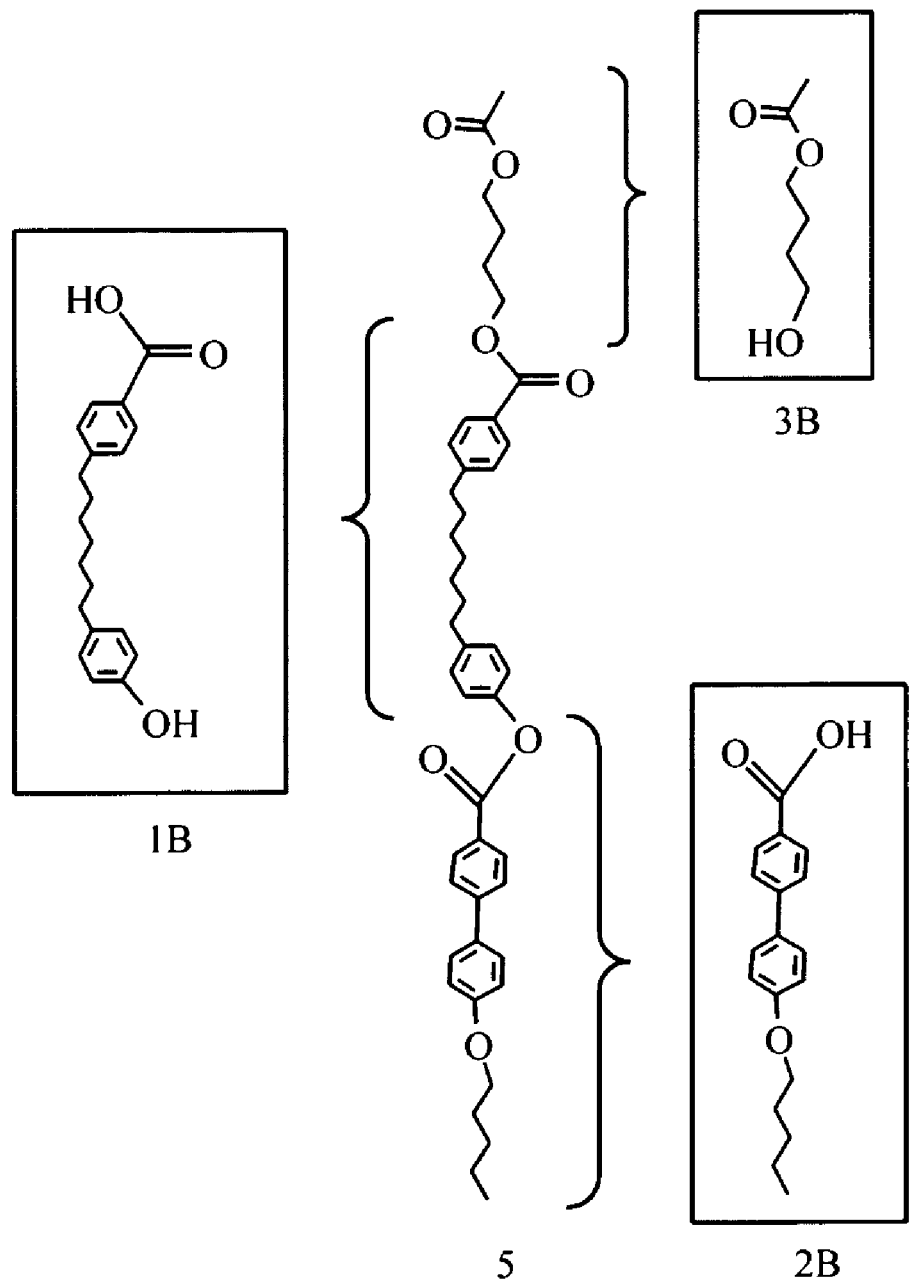

Of particular interest in certain representative embodiments are the linear oligomeric compounds depicted in FIGS. 1 and 2. First oligomer 4 of FIG. 1 is an oligomer prepared from monomers 3, 2 and 1. The oligomers of FIG.

1 and the preparation thereof are described in Moore & Stupp, J. Am. Chem. Soc. (1992) 114: 9; and Stupp et al., Science (1993) 259:59–63. Second oligomer 5 of FIG. 2 is an oligomer of monomers 1B, 2B and 3B. The preparation of the oligomer and monomer components thereof shown in FIG. 2 is readily practiced by one of skill in the art, based on knowledge of the art, including the above specific references concerning the oligomer and monomer reagents of FIG. 1.

As can be seen in FIG. 1, the oligomeric compound 4 is made up of three block components, i.e., 1, 2 and 3. Component 1 includes a reactive cyano group that is employed in cross-linking to covalently bond adjacent first molecules 4 together in the cross-linking step. Component 2 is a short rod-coil monomer that, in the context of compound 4, provides rigidity and layer forming properties. Component 3 includes an end group, e.g., a vinyl moiety, which can be polymerized in order to covalently cross-link adjacent layers of the molecules together.

Second oligomeric molecule 5 shares the same basic structure as first oligomeric molecule 4. However, second oligomeric molecule 5 lacks the cyano and vinyl cross-linking functionalities present in first molecule 4, and includes methyl moieties in place of these functionalities. In certain embodiments, the terminal methyl group may be replaced with other groups that promote a desired organization of the composite structure, e.g., —CF$_3$, —CH$_3$, —OH, —COOH, —CN, etc.

Figure 3A:
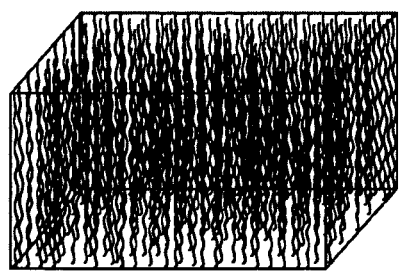
Figure 3A:
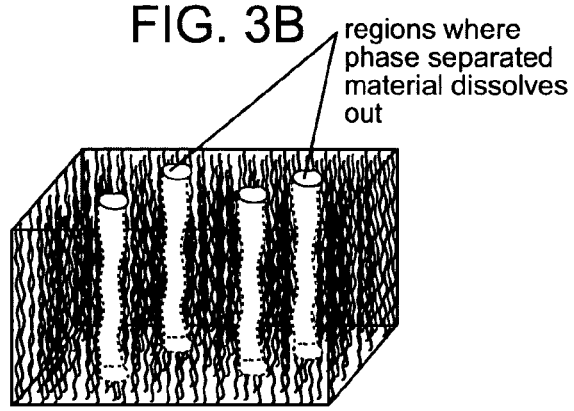

The above described embodiment produces a two-dimensional sheet structure, as shown in FIG. 3, which upon phase separation results in the production of a porous two-dimensional sheet as shown in FIG. 3B.

In a second representative embodiment, the two or more different molecules employed to prepare the composite structure in the initial step are molecules that self-assemble into regular or defined nano-objects. In these embodiments, the two or more self-assembling molecules may be chosen so that the molecules self-assemble into defined or ordered nano-objects of narrow polydispersity, e.g., from about 1.0–1.5, including from about 1.05 to about 1.2, such as from about 1.06 to about 1.1.

In a specific representative embodiment of interest, the first and second molecules are molecules that have been referred to in the art as triblock rodcoil molecules. Such molecules typically include a first block that provides for aggregation and crystallization of the molecules, e.g., through self-assembly. The second block provides for the crosslinking functionality in the first type of molecule, which cross-linking functionality is absent in the second type of molecule. A block of particular interest is one that includes one or more sites of unsaturation, such as a random sequence of butadiene units. The third block provides diversity to the molecules, which limits crystal growth in three dimensions, as well as steric elements that limit the size of the aggregates that are formed upon self-assembly. A representative block of interest is oligostyrene.

Of particular interest as first molecules in certain embodiments are the triblock rodcoil molecules as described in Zubarev et al., Science (1999) 283:523, where a representative structure from this reference is:

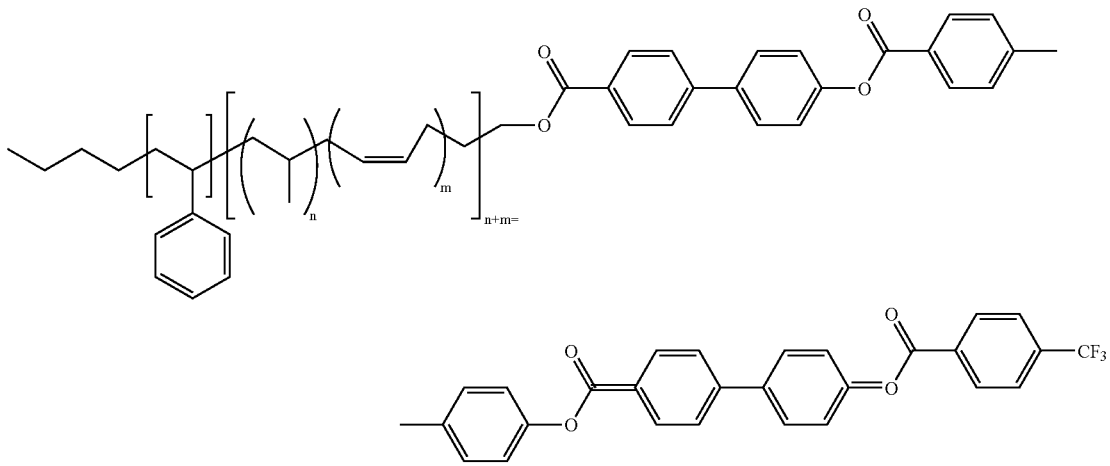

As stated above, the second molecules in these embodiments share the same backbone as the first molecules, but lack the crosslinking functionalities, e.g., the carbon-carbon double bonds of the second block of the first molecules.

The above specific examples of different pairings of first and second molecules are merely representative of the different types of self-assembling molecules that may be employed in the subject invention. Others pairings or grouping of molecules will become readily apparent to those of skill in the art upon reading the present disclosure, and such fall within the scope of the present invention.

Additional pairings of self-assembling molecules of interest may satisfy several important criteria. Within the miniature triblock polymer, the stiff rod-like segment may chemically exclude the flexible spacer (and associated cross-linking groups) as well as the flexible coil. This feature can be achieved by making the flexible spacer and the flexible coil chemically diverse and a periodic. In other words, if the flexible coil is synthesized from styrene monomers through living anionic polymerization, the result will be a random sequence of meso and racemic diads. Additionally, if isoprene is used as the basis of the flexible coil, then the result will be a mixture of 1,4 and 3,4 isomers along with 1,2 units. This mix of isomers in both cases, along with a narrow molecular weight distribution (i.e. similar to a poisson distribution or slightly narrower) helps ensure that the resulting self-assembled molecules form discrete objects rather than a 3D crystal. It is also important that the rod-like segments have a very high tendency to aggregate. In the previous examples, this was achieved by using rod-like segments based on biphenyl ester groups which have a tendency to aggregate as a result of π-π overlap. The attractive force that exists among the rod segments balances the repulsive force that exists among the flexible coil segments. This helps limit the size of the resulting nano-object. A specific example of another type of pairing is described in research conducted by Cho et al. Macromolecules 2002, 35, 4845, such as . The molecular structure of these molecules is shown below:

capable of cross-linking and stitching part of the structure together. Examples of some groups that are capable of crosslinking include acrylate and nitrile groups. Double bonds could also be used as pendant groups to provide an additional type of site for cross-linking or stitching reactions.

Another rigid-rod and flexible coil system is described by Jenekhe et al. Science 1998, 279, 1903–1907; and in Jenekhe et al., Science 1999, 283, 372–375. such as the structure shown below:

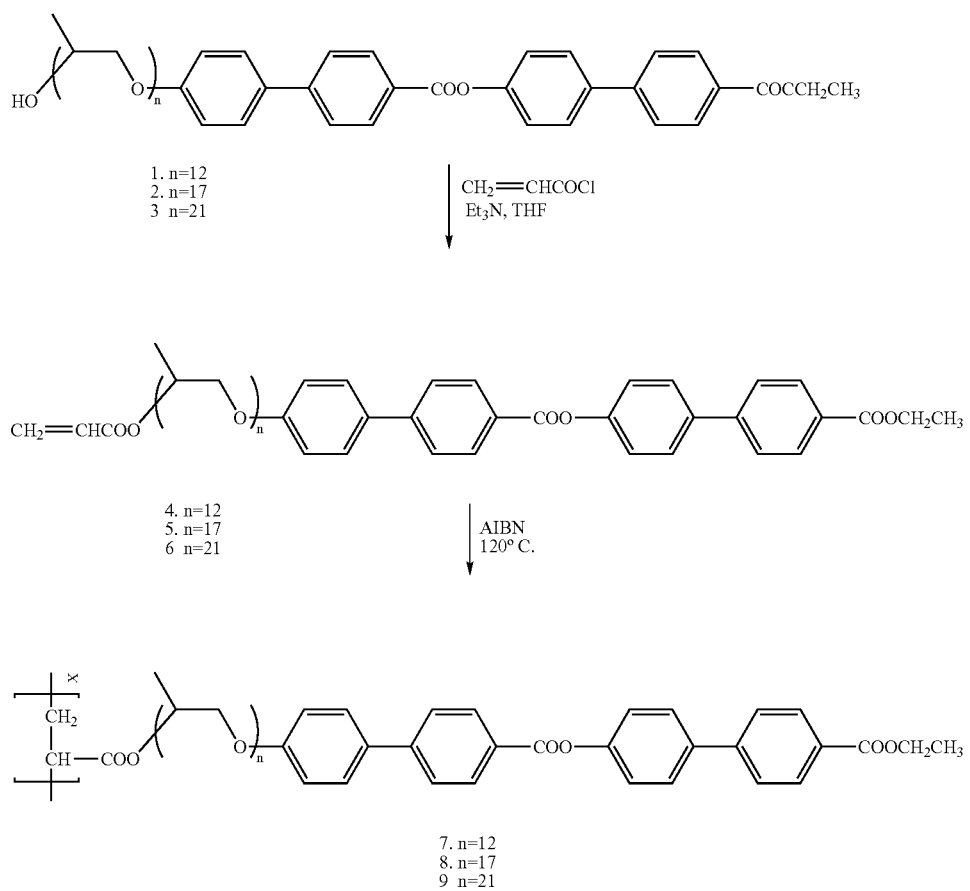

Although this system is based on modification of polymers with side chains, it does give examples on other types of flexible coils and components that are of interest to produce a linear triblock molecule for use in the present methods. One could use the biphenyl ester segments again for the rigid block and substitute a PPO based molecule for the flexible coil. Since PPO units have a smaller cross-section compared with styrene units, the resulting nanostructures would likely have a different size. This would be a result of a change in the balance of repulsive force among coil segments and attractive forces among rods. Molecules with a smaller cross-section would be able to pack at a greater density resulting in a nano-object that would likely be larger. To this structure (i.e. a combination of PPO and biphenyl groups), one would need to add a flexible spacer, such as polyisoprene. To this structure, one would then modify a portion of the molecules so that they contained a reactive group that is

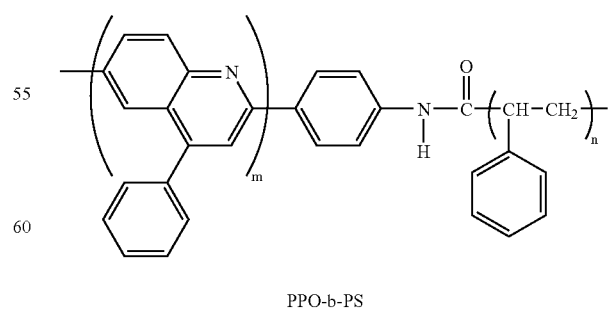

PPO-b-PS

The structures described therein may be converted to miniature triblock molecules by decreasing the length of each block and then by adding a flexible spacer between the rigid rod and the flexible coil system described in these references. Their system is based on flexible coils of polystyrene and rod-like blocks composed of polyquinoline. The flexible spacer that would then be added to such a system would either have a reactive group or not, depending on whether it is a first or second type of molecule. Other rigid rods of potential interest would include blocks based on: polyacetylene (PA), poly(p-phenylene vinylene) (PPV), poly(p-phenylene) (PPP), polythiophene (PT) and polypyrrole (PPy). The relative amount of attraction between the rods and their ability to pack and crystallize would affect the resulting size of the nanostructure when combined with the degree of repulsion found among the flexible coil molecules.

As indicated above, in the first step of the subject methods, the two or more self-assembling molecules are combined in the appropriate amounts under conditions sufficient for the first and second molecules to self-assemble or self-organize into the initial composite structure. The conditions under which the subject molecules are combined will vary depending upon the nature of the specific molecules being employed. Where desired, the molecules may be combined with agitation to uniformly mix or combine the molecules.

The molecules are typically present in a suitable solvent. Solvents of interest may be aqueous or non-aqueous, organic or inorganic, including polar and non-polar, solvents. Solvents of particular interest include, but are not limited to: methanol, ethanol, ethyl acetate, acetonitrile, chloroform, tetrahydrofuran and toluene.

The combined molecules in the appropriate solvent are typically maintained at a temperature and for a time sufficient for the desired composite structure to form. Typically, the molecules are maintained at a temperature ranging from about 150° C. to about 300° C., such as from about 200° C. to about 250° C., and for a time ranging from about 30 minutes to about 4 hours, such as from about 1 hour to about 2 hours.

Under such conditions, the first and second molecules self-assemble into regular, ordered composite structures. As indicated above, the resultant composite structures may have a number of different configurations, depending on the particular molecules employed to make the structures, the conditions of self-assembly, and the like. A feature of the resultant composite structures is that they are made up of both molecules that include a cross-linking functionality, and molecules that lack a cross-linking functionality. Depending on the nature of the molecules that lack the cross-linking functionality, in certain embodiments, these molecules may be clustered together within the larger composite structure, such that the resultant composite structure has regions that are rich in second molecules and regions that are poor in second molecules.

Stabilization of the Composition Structure Into a Shape Invariant Structure

As summarized above, in the next step of the subject methods, the resultant composite structure is stabilized to produce a shape invariant composite structure. The composite structure produced in the first step is converted to a shape invariant structure, i.e., a stabilized structure that is not fluid, where the constituent molecules are covalently bonded to one another, by subjecting the composite structure to a stimulus capable of causing the cross-linking or covalent bonding functionalities of a portion of the molecules making up the composite structure to produce covalent bonds between the molecules of this portion, i.e., to cross-link or stitch together those molecules that include the appropriate cross-linking functionality. The stimulus may be a variety of different types of stimuli, depending on the nature of the molecules, where representative stimuli of interest include, but are not limited to: addition of a chemical agent, temperature change, pH modulation, change of solvent, and the like. For example, where temperature change is the stimulus employed to crosslink a portion of the molecules of the composite structure, the temperature of the structure may be raised to temperature of from about 150° C. to about 300° C., such as from about 200° C. to about 250° C., for a period of time ranging from about 30 minutes to about 4 hours, such as from about 1 hour to about 2 hours. The above step results in the production of a stabilized composite structure in which a portion of the constituent molecules, e.g., the first molecules in a composite structure made up of populations of first and second molecules, are covalently bonded to each other, i.e., are cross-linked, such that the composite structure is now a shape invariant structure. A feature of the resultant shape invariant structures is that a portion of the constituent molecules making up the structure that lacks the covalent bonding functionality found in the other portion of the constituent molecules, e.g., the second molecules, is still present in the structure. This non-covalently bonded or non-crosslinked portion of sub-population of the composite structure is then separated from the remainder of the composite structure in the final step of the subject methods.

Separation of the Non-Covalently Bonded Molecules from the Shape Invariant Structure In the next step of the subject methods, that portion of the molecules making up the composite structure are removed or separated from the remainder of the stabilized composite structure, to produce the desired nanoporous composite structure. The non-covalently bonded molecules of the stabilized composite structure may be separated from the remainder of the structure using any convenient protocol.

In many embodiments, the composite structure is placed in a solvent into which the second molecules dissolve out of the composite structure. For example, the composite structure may be immersed in a solvent in which the second molecules are highly soluble, resulting in the molecules dissolving out of the composite structure. Solvents of interest for this particular embodiment include those described above, and will be chosen with respect to the specific nature of the second molecule to be dissolved out.

Dissolution of non-covalently bonded molecules out of the composite structure results in the production of an object in which pores are present where the non-covalently bonded molecules used to reside prior to the separation step. As such, the above-described methods result in the production of a nanoporous structure that has a regular order or organization and includes one or more, often a plurality of nanopores. By "nanopore" is meant a pore or passage through the structure that has a nanoscale inner diameter, where the inner diameter ranges, in many embodiments, from about 1 to about 20 nm, such as from about 1 to about 2 nm, where a feature of the structures produced by many embodiments of the subject methods is that the nanopores have inner diameters that are less than about 5 nm, e.g., they do not exceed about 5 nm. A feature of the resultant nanoporous structures are that they are stable, in that the constituent molecule members are covalently bonded or crosslinked to one another, such that the structure is not fluid and not readily disrupted.

The subject methods result in the production of nanoporous structures, as described above, of consistent size and consistent porosity, in that while the methods result in the production of a population of structures as the same time, the resultant population has a narrow polydispersity, in terms of variations in size of the resultant structures, variations in porosity of the resultant structures, variations in pore diameter of the resultant structures, etc.

Utility

The nanoporous structures produced according to the subject invention find use in a number of different applications, including, but not limited to, electronic applications, analytical applications and biotechnology applications.

Specific representative electronics applications in which the structures produced according to the subject invention may find use include, but are not limited to: sensors, waveguides and the like.

Analytical applications in which the subject nanoporous structures may find use are also varied, as a number of different analytical applications are currently known that employ nanopore devices, where the product nanoporous structures of the present invention may be used as nanopore elements in such devices, e.g., in place of the α-hemolysin component of such devices. Nanopore devices in which the subject structures may find use, include but are not limited to, those described in U.S. Pat. Nos. 6,267,872; 6,362,002; 6,428,959; and 6,465,193; the disclosures of which are herein incorporated by reference. Representative devices are also described in: Kasianowicz et al., Proc. Nat'l Acad. Sci. USA (1996) 93:13770–13773; Akeson et al., Biophys. J. (1999) 77:3227–3233; Meller et al., Proc. Nat'l Acad. Sci. USA (2000) 97:1079–1084; Bayley et al., Nature (2001) 413: 226–230 and Li et al., Nature (2001) 412: 166–169. As such, the subject structures may find use in devices that analyze nucleic acids, such as double-and single stranded nucleic acid characterization applications, e.g., nucleic acid sequencing applications.

Also of interest are biotechnology applications, in which the subject structures are used to modulate or alter biological systems. For example, the subject structures may be employed as artificial or synthetic pore forming structures in cell walls, etc.

Accordingly, the structures produced by the subject methods find use in a variety of different applications, where the above provided applications are merely representative of the multitude of different applications in which the subject structures find use.

Kits

Also provided are kits and systems for use in practicing the subject invention, where such kits may comprise containers, each with one or more of the various reagents/compositions utilized in the methods, where such reagents/compositions typically at least include the two or more self-assembling molecules that may be employed in the subject methods. The kits may further include a number of additional components, e.g., solvents for use in the self-assembly step, solvents employed in the separation step, etc.

Finally, the kits may further include instructions for using the kit components in the subject methods. The instructions may be printed on a substrate, such as paper or plastic, etc. As such, the instructions may be present in the kits as a package insert, in the labeling of the container of the kit or components thereof (i.e., associated with the packaging or sub-packaging) etc. In other embodiments, the instructions are present as an electronic storage data file present on a suitable computer readable storage medium, e.g., CD-ROM, diskette, etc.

The following examples are offered by way of illustration and not by way of limitation.

Experimental

The necessary steps for the basic synthesis of the mushroom-shaped structure are described in several references. See e.g., M. Szwarc, *Carbanion, Living polymers, and Electron Transfer Processes*, Wiley-Interscience, New York, 1968; M. Morton, *Anionic polymerization: Principles and Practice*, Academic Press, New York, 1983; P. J. Manson, *Polym. Sci. Polym. Chem. Ed.* 18, 1945 (1980)] [R. P. Quirk and W. C. Chen, *Makromol. Chem.* 22, 85 (1989); and J. S. Moore and S. I. Stupp, *Macromolecules* 23, 65 (1990). A living anionic polymerization reaction (Szwarc) using a small amount of styrene monomer is used to create the random coil portion of the miniature triblock molecule. Using only a small amount of styrene monomer insures that the resulting structure has a low degree of polymerization. The flexible spacer, comprised of isoprene for example, can be synthesized by adding isoprene monomer to the reaction mixture. (M. Morton) These compounds will insert themselves between the living anion and the lithium ion. The result will be a short chain of polyisoprene, in different isomeric configurations. To stop the living anionic polymerization reaction, $CO_2$ is added to the reaction. This adds a carboxyl group at the end of the chain that can be used as a reactive site for further reactions. [P. J. Manson] At this point, the resulting structure represents a diblock molecule, a combination of the random coil and the flexible spacer. The building blocks for the biphenyl ester segments can be made in a manner similar to that described in Huggins et al., Macromolecules 1997, 30, 5305–5312. Briefly, 4'-hydroxy-4-biphenylcarboxylic acid (4 g, 18.67 mmol) and sodium hydroxide (1.64 g, 41.1 mmol) is dissolved in 50 mL of water and ethanol (8 mL) at −10° C. Methyl chloroformate (1.73 mL, 22.4 mmol) is then added to the solution at a temperature of −5° C. The resultant mix is then stirred for 40 min., following which a solution of water and hydrochloric acid in a 1:1 ratio is added until the entire solution becomes acidic. The resulting precipitate is collected by vacuum filtration, washed multiple times with distilled water and then dried. A molecule that can be used as the rigid rod component of the triblock molecule is the product of the above process. An esterification reaction is then used to attach the rigid biphenyl ester segments to the diblock molecule containing the random coil and flexible spacer blocks. (Moore and Stupp). This action involves several deprotection steps as well, to add additional units of the biphenyl ester segments. To create an object with holes, one synthesizes the triblock molecule but with a flexible spacer that does not have a group that can form crosslinks.

Figure 4A:
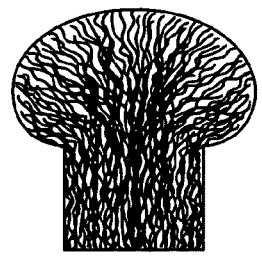
Figure 4B:
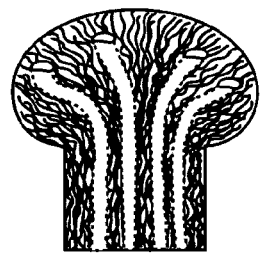

FIG. 4A provides a representation of the mushroom shaped object prepared upon self-assembly of the above described precursor molecules, while FIG. 4B shows the resultant nanoporous structure produced upon separation of the non-crosslinked compounds from the structure.

It is evident from the above results and discussion that improved process for fabricating porous nanostructures is provided. The subject methods are self-assembly methods and, as such, do not require elaborate or expensive laboratory equipment to perform. The nanostructures produced by the subject methods are consistent in terms of size, porosity and pore diameter. In addition, the structures have pores of small diameters, where the methods allow one to tailor the objects produced to have particular pore sizes of interest. The structures produced by the subject methods find use in a variety of different applications, including electronic, analytical and biotechnology applications. Accordingly, the subject invention represents a significant contribution to the art.

All publications and patent applications cited in this specification are herein incorporated by reference as if each individual publication or patent application were specifically and individually indicated to be incorporated by reference. The citation of any publication is for its disclosure prior to the filing date and should not be construed as an admission that the present invention is not entitled to antedate such publication by virtue of prior invention.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

What is claimed is:

1. A method of making a nanoporous structure, said method comprising:
   (a) combining first and second self-assembling molecules under conditions sufficient for said first and second molecules to self-assemble into an ordered composite structure of said first and second molecules held together by non-covalent interactions, wherein said first molecules include a cross-linking functionality that is lacking in said second molecules;
   (b) covalently bonding said first molecules via said cross-linking functionality to produce a stabilized composite structure; and
   (c) separating said second molecules from said stabilized composite structure to produce said nanoporous structure.

2. The method according to claim 1, wherein said nanoporous structure has two or more nanopores.

3. The method according to claim 2, wherein said two or more nanopores are uniform and regularly positioned in said structure in a regular pattern.

4. The method according to claim 1, wherein nanopores of said nanoporous structure have an inner diameter that does not exceed about 5 nm.

5. The method according to claim 1, wherein said structure is a sheet.

6. The method according to claim 1, wherein said structure is a nano-object.

7. The method according to claim 1, wherein said first and second self-assembling molecules are linear molecules.

8. The method according to claim 7, wherein said first and second linear self-assembling molecules have a length of from about 4 to about 50 nm.

9. The method according to claim 1, wherein said first molecule comprises a single cross-linking functionality.

10. The method according to claim 1, wherein said first molecule comprises two different cross-linking functionalities.

11. The method according to claim 1, wherein said first and second molecules are organic molecules.

12. The method according to claim 1, wherein said separating step (c) comprises immersing said stabilized composite structure in a solvent for said second molecules so said second molecules separate from the remainder of said structure.

13. The method according to claim 1, wherein said first and second molecules share a common back-bone structure.

14. The method according to claim 13, wherein said nanoporous structure comprises uniform and regularly positioned nanopores in a regular pattern.

* * * * *